July 18, 1950        J. F. O'BRIEN        2,515,257
ELECTRICAL RECEPTACLE WITH CORD CAP RETAINER
Filed March 4, 1947
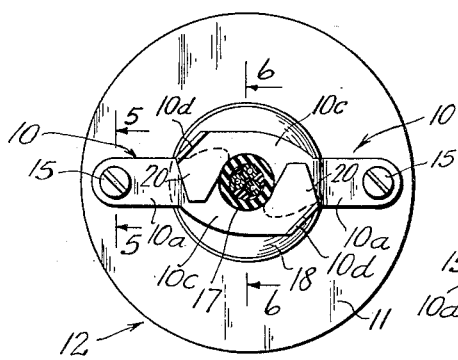
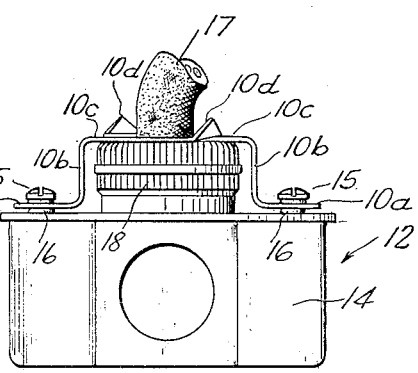
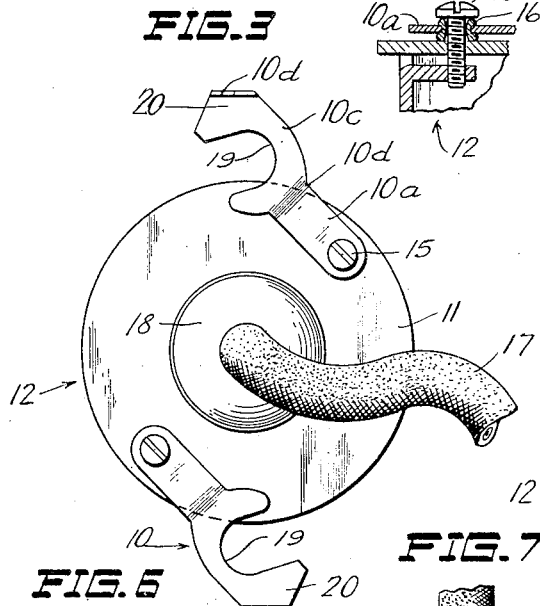
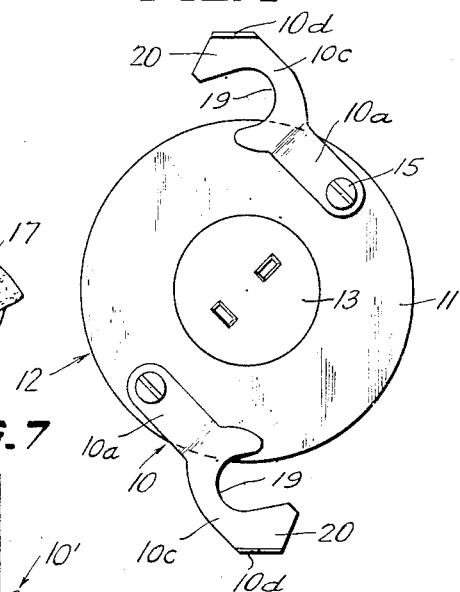
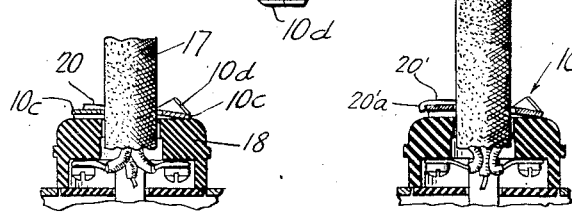
INVENTOR
Joseph F. O'Brien
ATTORNEY Patented July 18, 1950

2,515,257

UNITED STATES PATENT OFFICE 2,515,257

ELECTRICAL RECEPTACLE WITH CORD CAP RETAINER

Joseph F. O'Brien, Lebanon, N. J., assignor to John B. Pierce Foundation, New York, N. Y., a corporation of New York Application March 4, 1947, Serial No. 732,306

2 Claims. (Cl. 174—54)

This invention relates to electrical receptacles affording plug-in connection for electric utility appliances with a source of electricity.

The plug-in connections are usually made by means of flexible electric cords equipped with what is known in the art as cord caps, the same comprising plug-in blades for mating insertion in corresponding outlet openings of the electrical receptacles.

It is an object of the invention to provide for the locking of the cord cap in its plugged-in relationship with the electrical receptacle, so that accidental jerking of the cord will not break the electrical connection.

It is an object to enable the accomplishment of such locking of the cord cap conveniently, by inexpensive structure permanently attached to the electrical receptacle.

It is a further object to provide for the securement of the locking structure to the receptacle by means of the fasteners ordinarily employed in the assembly of the receptacle.

Additional features of the invention will appear hereinafter.

In the accompanying drawings:

Fig. 1 illustrates in top plan one specific embodiment of the invention as applied to an industrial type electrical receptacle, an electric cord being shown locked in position by the device;

Fig. 2 is a side elevation, showing an additional length of the electric cord;

Fig. 3 is a view corresponding generally to that of Fig. 1 but showing the device unlocked;

Fig. 4 is a similar view showing the electric cord removed;

Fig. 5 is a fragmentary vertical section taken on the line 5—5, Fig. 1;

Fig. 6 is a fragmentary vertical section taken on the line 6—6, Fig. 1; and

Fig. 7 is a corresponding view, but illustrating a somewhat modified construction.

Referring now to the drawings, the embodiment of Figs. 1 through 5 comprises a pair of cooperative locking clips, designated 10, respectively, pivoted to the face plate 11 of the electrical receptacle 12 at mutually opposite sides of the plug-in outlet 13, see Fig. 4.

In the illustrated instance the electrical receptacle 12 is an industrial type, of conventional construction. The face plate 11 thereof is secured to a cupped body 14 by means of respective screws 15, and the locking clips 10 are attached to the face plate by the same screws. As illustrated in Fig. 5, the pivotal mounting of such locking clips is accomplished by respective grommets 16, through which the said screws extend and against which they cinch down tight. The locking clips are free to rotate on the respective grommets.

Each locking clip is preferably stamped from metal to provide a mounting foot 10a, a riser 10b, and a cord-clasping member 10c. The grommet 16 is fitted into a suitably provided aperture at the free end of mounting foot 10a, and cord-clasping member 10c is deeply indentured for receiving the electric cord. The entire locking clip is dimensioned in accordance with the electric cord and cord cap customarily employed with the receptacle; thus, the riser 10a extends substantially the height of the cap from the base of the blades thereof to the level of emergence of the cord, see the cord 17 and its cap 18 in Fig. 2. The deep indentation 19 in cord-clasping member 10c is biased toward the free end of such member, and is of such size as to comfortably accommodate the thickness of the cord substantially without freedom for play.

The two clips of the pair are installed so as to extend oppositely. Thus, when brought together, they clasp the cord from opposite sides, hugging the same closely, see Fig. 1. They are arranged to interengage, that is to say, so that the free end 20 of each rests upon the other, as shown.

Each clip is preferably provided with an upstanding tip 10d affording a hold for the finger in manipulating the clip from open to closed position and vice versa.

Both clips of the pair should be sufficiently strong to effectively withstand sudden and intense jerking of the cord, thereby resisting pulling out of the cord cap from its plugged-in connection with the receptacle. They are preferably made stiffly resilient, so that they become tensioned in the interengaged locking position afore-described and hug each other closely, resisting disengagement.

As illustrated in Fig. 7, where like parts are designated by like reference characters primed, the free ends of each locking clip of the pair may be extended at the mouth of the cord-receiving indentations, transversely of the clip length, and turned down so as to overhang the adjacent edge of the opposing clip when in interengaged position. Thus, each clip 10' has its free end 20' extended and turned down, as at 20'a, thereby further securing the locking engagement of the two clips.

Whereas the invention is here illustrated and described with respect to preferred specific forms thereof it should be understood that various changes may be made in such forms and various other forms may be constructed on the basis of the teachings hereof by those skilled in the art without departing from the scope of the invention as defined by the following claims.

I claim:

1. In combination with an electrical receptacle having a face plate and outlet means therein for plugging-in a cord cap, a pair of interengaging cooperative clips pivoted to the face plate of said receptacle and adapted to swing over and away from the outlet means of said receptacle and overlie the cord cap to hold it in plugged-in relationship with the receptacle, said clips being resilient and including cord-clasping parts indentured in a direction biased toward the free ends of said clips for cooperatively encircling the electrical cord substantially at its emergence from the cord cap.

2. In combination with an electrical receptacle having a face plate and outlet means therein for plugging-in a cord cap, a pair of interengaging cooperative clips pivoted to the face plate of said receptacle and adapted to swing over and away from the outlet means of said receptacle and overlie the cord cap to hold it in plugged-in relationship with the receptacle, said clips being resilient and including cord-clasping parts indentured for cooperatively encircling the electrical cord substantially at its emergence from the cord cap, the free end of each clip extending at the mouth of the cord-receiving indenture transversely of the clip length and being turned toward the coacting clip so as to overhang the adjacent edge of the coacting clip when the clips are interengaged.

JOSEPH F. O'BRIEN.

REFERENCES CITED

The following references are of record in the file of this patent:

UNITED STATES PATENTS

| Number | Name | Date |
|---|---|---|
| 1,989,823 | Raabe | Feb. 5, 1935 |
| 2,219,931 | Matheny | Oct. 29, 1940 |
| 2,399,644 | Lachance | May 7, 1946 |